United States Patent [19]

Chang

[11] Patent Number: 4,681,911

[45] Date of Patent: Jul. 21, 1987

[54] REINFORCED COMPOSITES

[75] Inventor: Ike Y. Chang, West Chester, Pa.

[73] Assignee: E.I. Du Pont de Nemours and Company, Wilmington, Del.

[21] Appl. No.: 819,562

[22] Filed: Jan. 17, 1986

[51] Int. Cl.⁴ .......................... C08K 7/14; C08L 77/00
[52] U.S. Cl. ..................................... 524/607; 525/432
[58] Field of Search .................. 524/607; 525/432; 528/338

[56] References Cited

U.S. PATENT DOCUMENTS

| | | | |
|---|---|---|---|
| 3,597,400 | 8/1971 | Kashiro et al. | 260/78 R |
| 4,369,305 | 1/1983 | Pagilagan | 528/338 |
| 4,404,317 | 9/1983 | Epstein et al. | 524/538 |
| 4,511,690 | 4/1985 | Chang | 524/606 |
| 4,536,541 | 8/1985 | Latham | 525/66 |

Primary Examiner—Lewis T. Jacobs

[57] ABSTRACT

Composites of certain amorphous copolyamides are reinforced with glass, p-aramid or carbon filaments.

4 Claims, No Drawings

REINFORCED COMPOSITES

BACKGROUND OF THE INVENTION

This invention relates to an improved composite formed of certain amorphous copolyamides reinforced with glass, p-aramid or carbon fiber.

Fiber reinforced composites have become an important part of the arsenal of structural materials available today. Both thermosetting and thermoplastic resins are commonly used as matrix material for reinforced composites, and glass, p-aramid and carbon fibers among others are well-known reinforcement materials. Although a great number of polymers are available from which to choose for use as the matrix component in a composite with any specific reinforcing fiber, only certain combinations will meet the severe requirements for particular applications. This technology is highly specialized and the suitability of any fiber with any particular matrix is unpredictable.

In recently issued U.S. Pat. No. 4,511,690, a composite made from the homopolymer of bis(para-amino cyclohexyl) methane and dodecanedioic acid (PACM-12) reinforced with p-aramid or graphite fiber is disclosed. Also reported in this patent is the fact that glass fiber is unsatisfactory as a reinforcement in this matrix polymer. This invention addresses the need for improved composites reinforced with glass as well as with other reinforcing fiber.

SUMMARY OF THE INVENTION

This invention provides a composite comprising a matrix formed of a copolyamide of the following units:

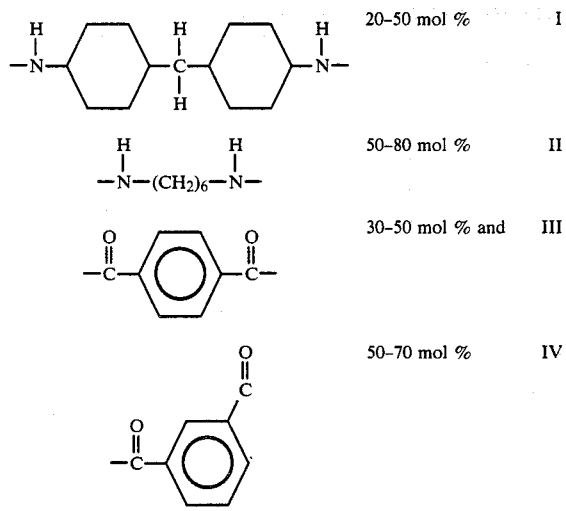

with units I and II constituting 100 mol % of the diamino radicals and units III and IV constituting 100 mol % of the diacid units, reinforced with from about 30 to 70% by volume of continuous filaments selected from the group of glass, carbon and p-aramid filaments.

DETAILED DESCRIPTION OF THE INVENTION

Copolyamide suitable for use as matrix in the present invention is an amorphous polymer described in U.S. Pat. No. 3,597,400. A procedure for making the polyamide is disclosed therein, there merely being need to adjust proportions of the reactants to fall within the range specified in this invention. As reactants, there may be employed terephthalic and isophthalic acid for units III and IV respectively, and bis(para-amino cyclohexyl) methane and hexamethylene diamine for units I and II respectively. The molar ratios selected herein provide a copolymer with excellent processability and a high glass transition temperature, $T_g$, for broad applications.

In preparing the copolyamide a small amount of glacial acetic acid (0.3–0.6% by wt. of polymer) is employed for control of molecular weight. A polymer having an inherent viscosity in the range of 0.6 to 1.0, measured as described below is preferred. Low viscosity polymers tend to be too brittle and unsuitable for structural applications. Polymer with too high an inherent viscosity renders composite processing and fabrication difficult if not impossible.

The continuous filament reinforcement used with this invention for structural applications are glass, carbon or p-aramid filaments. The term "p-aramid" is used to designate wholly aromatic polyamides whose chain extending bonds are either coaxial or parallel and oppositely directed. Useful in this invention is poly(p-phenylene terephthalamide) as well as copolymers thereof which yield high strength, high modulus filaments. In the examples below the glass fiber used is high-strength E-glass, a lime-borosilicate glass derived from a Pyrex ® composition, manufactured by Owens-Corning Fiberglass Corporation. The continuous filament yarns are woven into a plain-weave fabric of Style 1800 with weight of 9.4 oz/yd². The carbon fiber used is Magnamite graphite fiber type AS-4, a high-strength PAN-based fiber produced by Hercules Incorporated. Magnamite graphite fabric, Style A 193-P, in a balanced plain-weave construction utilizing 3,000-filament-count continuous AS-4 fiber was also used for composites fabrication. The p-aramid filaments employed in the examples are finish-free, zero-twist, poly(p-phenylene terephthalamide) filaments (1420 denier, 1000 filament Kevlar ®49 yarn manufactured by E. I. du Pont de Nemours and Company).

The composites may be prepared by any of a great variety of techniques. Thus, the fiber may be combined with matrix by solution coating of a polyamide tetrapolymer, by cowinding filaments of polyamide tetrapolymer with glass, carbon, or p-aramid filaments into a sheet and melting the polyamide tetrapolymer filaments to form the matrix; by depositing the copolyamide powder on a warp of glass, carbon or p-aramid filaments and melting to provide matrix; by extruding molten polyamide tetrapolymer onto a warp of the reinforcing filaments or by applying a film of copolyamide to both sides of a warp of the reinforcing filaments to make a sandwich which under heat and pressure forms a reinforced sheet. A plurality of such sheets can be stacked and formed under heat and pressure into a shaped reinforced structure. The same techniques can also be employed to combine the thermoplastic matrix with a finish-free fabric of glass, carbon or p-aramid filaments.

From about 30 to 70 volume percent of reinforcing continuous filaments are normally employed in the composites to achieve maximum properties although lesser amounts will also exhibit the improvements contemplated herein.

The reinforced continuous filament composites have high flexural and shear strengths, with glass transition temperature (Tg) above 140° C., as required for structural applications. The amorphous copolyamide matrix adheres to "finish free" glass, p-aramid and carbon fiber, whereas PACM-12 adheres poorly to finish-free glass. The reinforced composites have greater solvent stress cracking resistance than the unreinforced copolyamide.

TEST PROCEDURES

The glass transition temperature (Tg) is determined by use of differential scanning calorimetry (DSC) in accordance with ASTM D3418.

The inherent viscosity is determined by measuring a 0.5 percent solution (0.5 g polymer in 100 ml of solution) in m-cresol at a temperature of 25° C., in accordance with ASTM D2857.

Flex and interlaminar shear tests are ASTM D790 using a span/depth ratio of 16/1 for flex strength, and ASTM D2344 using a span/depth ratio of 4/1 for interlaminar shear or short beam shear strength. Strengths are reported in thousands of pounds per square inch (Ksi).

The dry specimens containing less than 0.2% moisture were used to determine Tg, inherent viscosity, and flex and interlaminar shear strengths.

EXPERIMENTAL RESULTS

Table 1 below lists two different amorphous copolyamides and PACM-12 (as control) that are used as matrices in the examples. The compositions in Table 1 are designated by numbers and letters that have the following meaning: "6" means hexamethylenediamine, "I" means isophthalic acid, "T" means terephthalic acid, "PACM" means bis(para-amino cyclohexyl) methane, "12" means dodecanedioic acid. Thus, in Table 1, polyamide number 1 (as control) is a homopolymer derived from bis(para-amino cyclohexyl) methane and dodecanedioic acid; polyamide number 2 contains 37.4% by weight of polyamide units derived from hexamethylenediamine and isophthalic acid, 25.0% by weight of polyamide units derived from hexamethylenediamine and terephthalic acid, 22.6% by weight of polyamide units derived from bis(para-amino cyclohexyl) methane and isophthalic acid, 15.0% by weight of polyamide derived from bis(para-amino cyclohexyl) methane and terephthalic acid. In terms of the individual acids and diamines employed, this polyamide contains 68.9 mol % hexamethylenediamine, 31.1 mol % bis(para-amino cyclohexyl) methane, for a total of 100% diamine, and 60% isophthalic acid and 40% terephthalic acid, for a total of 100% acid. The polyamide number 3 in Table 1 contains 30% by weight of polyamide units derived from hexamethylenediamine and isophthalic acid, 20% by weight of polyamide units derived from hexamethylenediamine and terephthalic acid, 30% by weight of polyamide units derived from bis(para-amino cyclohexyl) methane and isophthalic acid, 20% by weight of polyamide units derived from bis(para-amino cyclohexyl) methane and terephthalic acid. In terms of individual acids and diamines employed this polyamide contains 57.2 mol % hexamethylenediamine, 42.8 mol % bis(para-amino cyclohexyl) methane in a total of 100% diamine; 60% isophthalic acid and 40% terephthalic acid, in a total of 100% acid.

TABLE 1

| Number | Composition | Inherent Viscosity | Tg(DSC) °C. |
|---|---|---|---|
| 1 | *PACM-12 | 1.2 | 136 |
| 2 | *6I/6T/PACM-I/PACM-T (37.4/25.0/22.6/15.0% by weight) HMD/PACM/I/T (68.9/31.1/60/40 mol %) | 0.68 | 160 |
| 3 | *6I/6T/PACM-I/PACM-T (30/20/30/20% by weight) HMD/PACM/I/T (57.2/42.8/60/40 mol %) | 0.72 | 167 |

*These polymers also contain ca. 0.1% by weight of the antioxidant sodium phenylphosphinate added with the monomers at the beginning of the autoclave polymerization cycle. The PACM monomers used in polyamide number 1, 2 and 3 contain 70%, 48%, and 48% trans, trans stereoisomers, respectively.

EXAMPLE 1

This example compares a series of laminates from plain-weave E-glass fabric of style 1800 with polyamide matrices number 1-3 listed in Table 1 with respect to flex and shear strengths. In these laminates the filaments run at 0°, 90°, that is at right angles. The fabric reinforcement comprised 58% by volume of the composites. The size was removed from the fabric by heating at 500° C. for 2 hours in a preheated furnace before polyamide matrix was applied. The size-free fabric was first precoated with 3-4% (by weight) polyamide matrix from a solution of methylene chloride/formic acid. The pre-coated fabric was dried in a vacuum oven at 110° C. overnight. Additional polyamide matrix resin in powder form was then evenly sprinkled onto each layer of the precoated fabric. A total of twelve layers of fabric were stacked alternately with polyamide matrix to make a panel (7×7 inch) ca. 0.1 inch thick after consolidation by compression molding at 300°-315° C. and a pressure of 440 psi for 30 minutes. After cooling, test bars of appropriate size were cut from the panels parallel to a principle direction of the reinforcement. Data on the flex and interlaminar shear strengths appear in Table 2 below.

TABLE 2

| Mechanical Properties of Fiberglass Composites | | |
|---|---|---|
| Polyamide Matrix Identification | Flex Strength (Ksi) | Interlaminar Shear Strength (Ksi) |
| 1 | 26 | 2.9 |
| 2 | 50 | 6.2 |
| 3 | 51 | 6.0 |

The above data show the marked improvement obtained in use of the amorphous copolyamide over PACM-12 in glass reinforced composites with regard to composite flex and interlaminar shear strengths.

EXAMPLE 2

Carbon fiber composites with copolyamide matrices were prepared by fabric/powder stacking or extrusion coating processes. A Magnamite graphite fabric (Style 193-P) or AS-4 fiber (3000 filament tow) were used, respectively. In the fabric/powder process, the size was removed by washing the fabric with hot methyl-ethylketone. The polyamide matrix powder was then applied to the size-free fabric. A total of thirteen layers of fabric were stacked to make a panel ca. 0.1 inch thick after consolidation, and the test bars were made as described in Example 1. In the extrusion coating process, the carbon fiber tows were spread into ribbonlike form and passed under tension across the heated arcuate head of a screw extruder where copolyamide matrix was metered into and through the filaments. After cooling and winding, the polymer-coated reinforcing filaments were cut to 5.9 inch lengths and a sufficient number of pieces to fill a mold 6.0×0.5 inches to a depth after consolidation of 0.125 inch were inserted in the mold parallel to the length. The mold was preheated to 300°-315° C., a plunger 6×0.5 inch was lowered into the mold, and the material was consolidated at a pressure of 850 psi for 30 minutes. The specimen was then removed from the mold, cooled, and any excess polymer was trimmed off. Each specimen was measured and weighed to assess density and completeness of consolidation. Properties of the composite specimens are as shown in Table 3 below.

TABLE 3

Mechanical Properties of Carbon Fiber Composites

| Process | Polyamide Matrix | Flex Strength (Ksi) | Interlaminar Shear Strength (Ksi) |
| --- | --- | --- | --- |
| Fabric/powder stacking* | 1 | 108 | 9.2 |
| Fabric/powder stacking* | 2 | 135 | 12.0 |
| Fabric/powder stacking* | 3 | 119 | 11.1 |
| Extrusion coating** | 1 | 187 | 12.6 |
| Extrusion coating** | 2 | 215 | 15.6 |

*Fabric composites with 0°, 90° fiber orientation and 55% fiber volume
**Unidirectional composites with 0° fiber orientation and 60% fiber volume

EXAMPLE 3

Unidirectional composites reinforced with p-aramid filaments were prepared by extrusion coating process as described in Example 2. Data on the flex and shear strengths of reinforced composites are compared in Table 4 with polyamide matrix number 1 (PACM-12 homopolymer) and the polyamide matrix number 2, as listed in Table 1.

TABLE 4

Mechanical Properties of Composites of P-Aramid Filaments

| Polyamide Matrix | % Fiber | Flex Strength (Ksi) | Interlaminar Shear Strength (Ksi) |
| --- | --- | --- | --- |
| 1 | 60 | 98 | 8.0 |
| 2 | 60 | 103 | 10.4 |

I claim:

1. A composite comprising a matrix formed of a copolyamide of the following units:

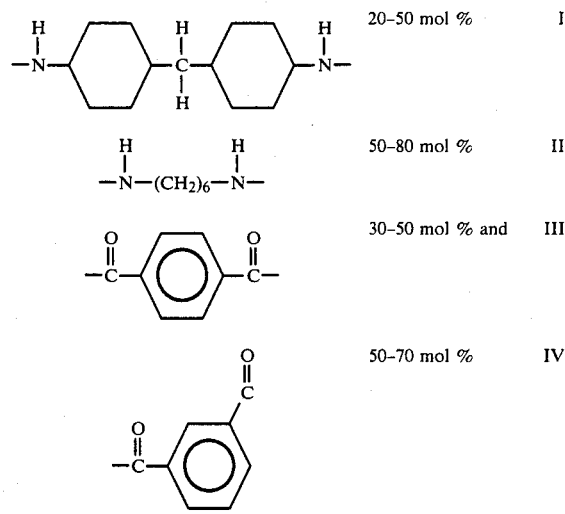

with units I and II constituting 100 mol % of the diamino radical and units III and IV constituting 100 mol % of the diacid units, reinforced with from about 30 to 70% by volume of continuous filaments selected from the group of glass, carbon and p-aramid filaments.

2. A composite according to claim 1 where the continuous filaments are glass.

3. A composite according to claim 1 where the continuous filaments are carbon.

4. A composite according to claim 1 where the continuous filaments are p-aramid.

* * * * *